United States Patent
Angel et al.

(10) Patent No.: US 10,053,344 B1
(45) Date of Patent: Aug. 21, 2018

(54) LEVELING SYSTEM INCLUDING STORAGE AND TRANSPORT HANDLE

(71) Applicant: CAMCO MANUFACTURING, INC., Greensboro, NC (US)

(72) Inventors: Bruce A. Angel, Stokesdale, NC (US); Anthony D. Moore, Summerfield, NC (US)

(73) Assignee: Camco Manufacturing, Inc., Greensboro, NC (US)

( * ) Notice: Subject to any disclaimer, the term of this patent is extended or adjusted under 35 U.S.C. 154(b) by 290 days.

(21) Appl. No.: 14/611,384

(22) Filed: Feb. 2, 2015

(51) Int. Cl.
  *B66F 7/24* (2006.01)
  *B60P 3/36* (2006.01)
  *B60T 3/00* (2006.01)

(52) U.S. Cl.
  CPC ............... *B66F 7/243* (2013.01); *B60P 3/36* (2013.01); *B60T 3/00* (2013.01)

(58) Field of Classification Search
  CPC ... B60C 3/36; B60C 3/00; B66F 7/243; B60T 3/00
  USPC .......................................................... 254/88
  See application file for complete search history.

(56) References Cited

U.S. PATENT DOCUMENTS

| | | | | |
|---|---|---|---|---|
| 1,493,475 A | * | 5/1924 | Cook ..................... | B66F 7/243 104/124 |
| 3,162,973 A | | 12/1964 | Christiansen ................ | 46/25 |
| 3,632,087 A | * | 1/1972 | Phillips .................... | B60P 3/36 254/88 |
| 3,752,441 A | | 8/1973 | Rogers ........................... | 254/88 |
| 4,165,862 A | * | 8/1979 | Bennett ..................... | B60P 3/36 254/88 |
| 4,311,237 A | * | 1/1982 | Hayes ..................... | A47G 23/08 206/203 |
| 4,427,179 A | | 1/1984 | Price ............................ | 254/88 |
| 4,615,416 A | * | 10/1986 | Wilson ...................... | B60T 3/00 188/32 |
| 4,697,294 A | * | 10/1987 | Schafer .................... | E01C 5/005 14/69.5 |
| 5,033,146 A | | 7/1991 | Fogarty et al. .............. | 14/69.5 |
| 5,328,154 A | | 7/1994 | Blatz et al. .................. | 254/88 |
| 5,458,315 A | * | 10/1995 | Blatz ........................ | B66F 7/243 254/88 |
| 5,483,715 A | | 1/1996 | Fogarty et al. .............. | 14/69.5 |
| 5,540,329 A | * | 7/1996 | Vogeley ................. | B25H 3/026 206/373 |

(Continued)

*Primary Examiner* — Christopher M Koehler
*Assistant Examiner* — Seahee Yoon
(74) *Attorney, Agent, or Firm* — Tuggle Duggins P.A.; Blake Hurt

(57) ABSTRACT

A leveling system includes a plurality of leveling blocks for leveling a relatively large vehicle and a handle for securing the plurality of leveling blocks together for convenient storage and transport of the leveling blocks without a container. Each leveling block includes a pattern of protrusions that extend upwardly from a top surface and a pattern of recesses formed in a bottom surface. Each leveling block has an opening formed therethrough and at least one of the openings is provided with an internal thread. The handle includes an extensible and retractable portion adjacent a proximate end thereof and an external thread at a longitudinal opposite distal end thereof. The handle is guided through the openings of the plurality of leveling blocks and the external thread engages the internal thread provided on the at least one opening to secure the leveling blocks together.

14 Claims, 7 Drawing Sheets

(56) References Cited

U.S. PATENT DOCUMENTS

| | | | | |
|---|---|---|---|---|
| 5,640,821 A | * | 6/1997 | Koch | A47F 5/16 |
| | | | | 404/33 |
| 5,762,460 A | * | 6/1998 | Rae | B65G 69/006 |
| | | | | 14/69.5 |
| D426,933 S | | 6/2000 | Redfern | D34/38 |
| 6,439,543 B1 | * | 8/2002 | Peckham | B66F 7/243 |
| | | | | 188/32 |
| 6,718,588 B1 | * | 4/2004 | Frederiksen | B65G 69/30 |
| | | | | 14/69.5 |
| D490,848 S | * | 6/2004 | Pope | D19/107 |
| 6,752,381 B2 | * | 6/2004 | Colak | B60T 3/00 |
| | | | | 254/88 |
| 6,910,675 B1 | * | 6/2005 | Cox | B66F 7/243 |
| | | | | 254/1 |
| D520,438 S | | 5/2006 | Colak et al. | D12/217 |
| 7,040,603 B1 | * | 5/2006 | Tai | B60P 3/36 |
| | | | | 254/88 |
| 7,344,051 B2 | * | 3/2008 | Flamingo | E01F 9/688 |
| | | | | 221/213 |
| 7,416,166 B1 | * | 8/2008 | Shaw | B66F 7/243 |
| | | | | 254/88 |
| 7,980,532 B2 | * | 7/2011 | Wickwire | B66F 7/243 |
| | | | | 254/88 |
| 8,002,241 B1 | | 8/2011 | Shaw | 254/88 |
| D652,952 S | * | 1/2012 | Angel | D25/113 |
| 8,573,609 B1 | * | 11/2013 | Moser | B62B 1/14 |
| | | | | 135/118 |
| D716,879 S | * | 11/2014 | Norman | D21/486 |
| 9,061,200 B2 | * | 6/2015 | Leicht | A63H 33/106 |
| 2005/0167547 A1 | * | 8/2005 | McLellan | B60Q 1/2615 |
| | | | | 248/74.4 |
| 2012/0090925 A1 | * | 4/2012 | White | B60P 3/36 |
| | | | | 188/32 |

\* cited by examiner

LEVELING SYSTEM INCLUDING STORAGE AND TRANSPORT HANDLE

FIELD OF THE INVENTION

The invention herein pertains to leveling systems for relatively large vehicles, such as recreational vehicles, campers, trailers and the like. More particularly, the invention pertains to a leveling system including a plurality of leveling blocks and a handle for convenient storage and transport of the leveling blocks.

BACKGROUND AND DESCRIPTION OF THE PRIOR ART

Various systems, devices and methods are available to level relatively large vehicles, such as recreational vehicles, campers, trailers and the like. It is oftentimes desirable to level a vehicle, and especially a recreational vehicle or camper, while parked for the comfort of any occupants and for the proper orientation and operation of any furnishings and appliances. A multi-tiered system of leveler units for leveling a vehicle is disclosed in U.S. Pat. No. 5,328,154 issued Jul. 12, 1994, to Blatz et al., and is commercially available from Tri-Lynx Corporation of Irving, Tex., USA under the trademark LYNX LEVELERS®. The leveling units consist of molded plastic or metallic blocks having a stackable, nesting and interlocking geometry for varying the overall height of a stack of the leveling blocks and preventing the leveling blocks from sliding relative to one another. The LYNX LEVELERS® system of leveler units and other commercially available leveling blocks typically include a container, box, case, bag or the like for storing and transporting the leveling blocks.

The containers, boxes, cases, bags presently available for storing and transporting leveling blocks suffer from various problems, drawbacks, deficiencies and disadvantages. The containers are usually made of a sturdy fabric, canvas or plastic material and include one or more handles, straps, etc. for lifting and carrying the containers with the leveling blocks stored inside. As a result, the containers significantly increase the weight and material cost of the leveling system. In addition, the containers are generally bulky, and thus, require additional space for storage, as well as additional shelf space for display in a retail environment. Furthermore, unless the container is made of a substantially transparent material, such as clear plastic, the functional design, geometry and aesthetics of the leveling blocks are not immediately and readily visible to a potential purchaser.

Thus, it is apparent a need exists for an improved leveling system for relatively large vehicles, such as recreational vehicles, campers, trailers and the like. A more particular need exists for a leveling system that does not require a container, box, case, or bag for storing and transporting the leveling blocks. A still further need exists for a leveling system consisting of a plurality of leveling blocks that can be displayed at a retail store such that a potential purchaser can immediately view and readily ascertain the functional design, geometry and aesthetics of the leveling blocks.

In view of the problems, drawbacks, deficiencies and disadvantages associated with the existing leveling systems, the present invention was conceived and one of its objectives is to provide an improved leveling system for leveling relatively large vehicles, such as recreational vehicles, campers, trailers and the like.

It is another objective of the present invention to provide a leveling system for a vehicle that does not require a container, such as a box, case, bag or the like, for storing and transporting the leveling blocks.

It is yet another object of the present invention to provide a leveling system for a vehicle that can be displayed at a retail store in such a manner that a potential purchaser can immediately view and readily ascertain the functional design, geometry and aesthetics of the leveling blocks.

It is a further object of the present invention to provide a leveling system with a handle that extends to aid in the transportation of the system but that collapses when the system is not in use.

Various other objectives and advantages of the present invention will become apparent to those skilled in the art as a more detailed description of exemplary embodiments of the invention is set forth below.

SUMMARY OF THE INVENTION

The aforementioned, as well as other objectives not expressly set forth herein, are realized by providing a leveling system for a vehicle according to the present invention as shown and described herein. In one embodiment, the present invention provides a leveling system for a vehicle including a plurality of leveling blocks, each leveling block having an opening therethrough. The leveling system further includes a handle configured for being received within the opening of each of the leveling blocks and operable for securing the plurality of leveling blocks together. The opening of each leveling block may be located at a longitudinal and lateral center of each leveling block. Each leveling block may define a plurality of protrusions that extend outwardly from the top surface of the leveling block, and a corresponding plurality of recesses formed in a bottom surface of the leveling block with each recess being configured to receive a protrusion of another leveling block therein such that the plurality of leveling blocks is stackable and interlocking. The handle may have an extensible and retractable portion adjacent a proximate end thereof and an external thread at a longitudinal opposite distal end thereof for engaging an internal thread provided on the opening of at least a bottommost one (base) of the plurality of leveling blocks. The extensible and retractable portion of the handle may include an elongated rod and the handle may include a reduced diameter portion at the proximate end thereof defining a central, longitudinal recess therein for receiving the rod of the extensible and retractable portion in a sliding relationship.

In another embodiment, the present invention provides a leveling system for leveling a relatively large vehicle, such as a recreational vehicle, camper, trailer and the like. The leveling system includes a plurality of stackable and interlocking leveling blocks. Each leveling block includes a body having a length, a width and a height, an opening formed through the body of the leveling block, a pattern of a plurality of protrusions that extend upwardly from a top surface of the body of the leveling block, and a pattern of a plurality of recesses formed in a bottom surface of the body of the leveling block. Each of the plurality of recesses is configured to receive a corresponding one of the plurality of protrusions of another one of the plurality of leveling blocks in a stacked and interlocked arrangement. At least one opening of the plurality of leveling blocks is provided with an internal thread. The leveling system includes a handle having an extensible and retractable portion adjacent a proximate end thereof and an external thread at a longitudinal opposite distal end thereof. The external thread is configured for rotatably engaging the internal thread provided on the at least one opening of the plurality of leveling blocks to secure the leveling blocks together in the stacked and interlocking arrangement. The handle is operable for securing the plurality of leveling blocks together for convenient storage, transport and/or display. The handle may include a reduced diameter portion at the proximate end thereof having a longitudinal central recess formed therein, and the extensible and retractable portion of the handle may include a rod configured to be received within the recess of the reduced diameter portion in a sliding relationship.

In yet another embodiment, the present invention provides a method for storing and transporting a plurality of leveling blocks. The method includes providing a plurality of leveling blocks for leveling a vehicle wherein each leveling block includes a body having an opening formed therethrough with at least one opening of the plurality of leveling blocks being configured to mechanically engage with a handle. The method further includes providing the handle having an extensible and retractable portion adjacent a proximate end thereof and an external thread at a longitudinal opposite distal end thereof. The method further includes guiding the handle through the openings of the plurality of leveling blocks, and engaging the external thread of the handle with the internal thread provided on the at least one opening of the plurality of leveling blocks to secure the leveling blocks together. Each leveling block may include at least one protrusion that extends upwardly from a top surface of the leveling block and at least one recess formed in a bottom surface of the leveling block. Accordingly, the method may further include receiving the protrusion of one of the plurality of leveling blocks within the recess of another of the plurality of leveling blocks so that the plurality of leveling blocks are in a stacked and interlocking arrangement. The handle may be operable for securing the leveling blocks together for convenient storage and transport without a container and/or for securing the leveling blocks together for display without a substantially transparent container.

BRIEF DESCRIPTION OF THE DRAWINGS

The aforementioned aspects, objects, features, advantages and embodiments of the present invention will be more fully understood and appreciated when considered in conjunction with the accompanying drawing figures, in which like reference characters designate the same or similar parts throughout the several views.

DETAILED DESCRIPTION OF EMBODIMENTS OF THE INVENTION

Figure 1:
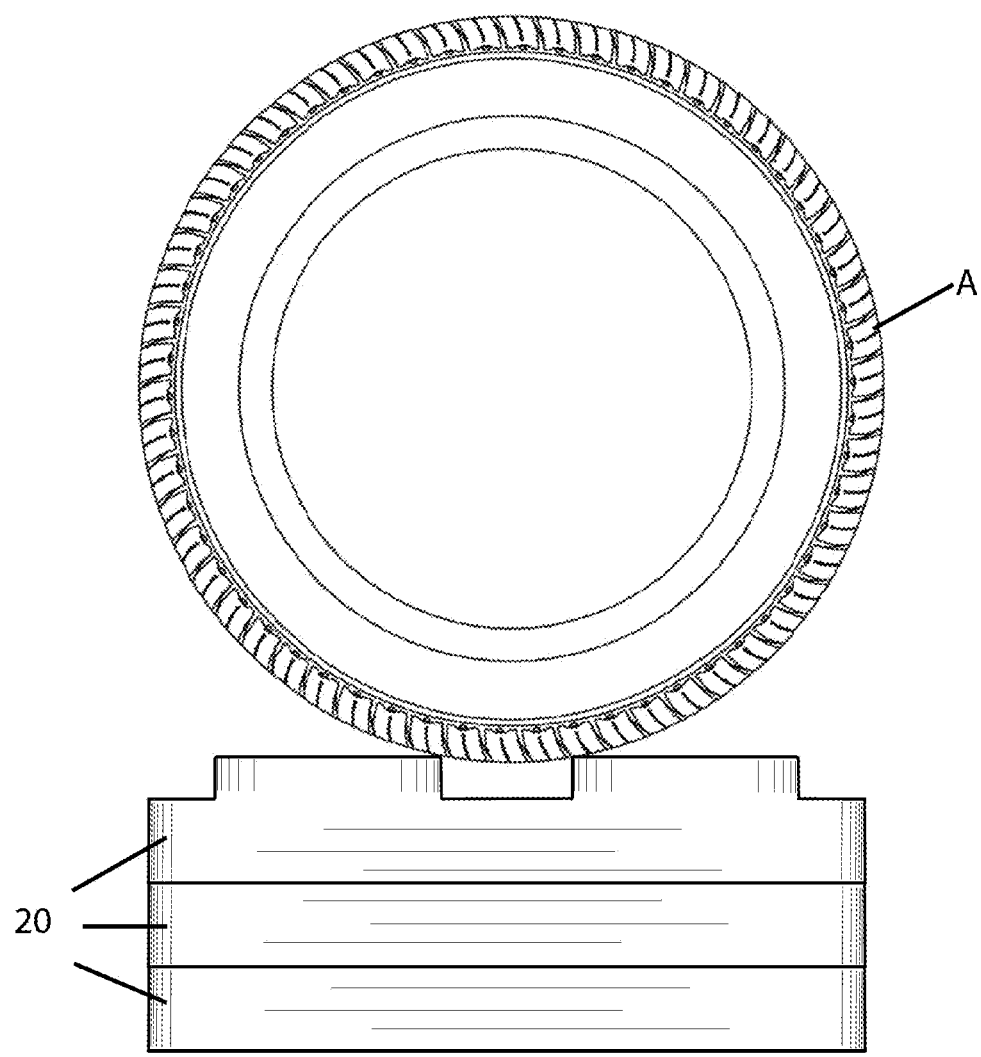
FIG. 1 is an elevational side view illustrating a plurality of leveling blocks according to the present invention operable for leveling a vehicle.

For a better understanding of the present invention and its operation, turning now to the drawings, FIG. 1 illustrates a leveling system operable for leveling a relatively large vehicle, such as a recreational vehicle, camper, trailer or the like. Leveling systems for leveling such vehicles are commonly referred to as "jack pads", "stacker blocks", "stabilizing pads", "leveler pads", "leveler blocks", "leveling pads", and "leveling blocks". For purposes of convenience only, the term "leveling blocks" is used generically herein to describe various exemplary embodiments of the present invention. FIG. 1 illustrates a plurality of leveling blocks, indicated generally by reference character 20, constructed in accordance with the present invention. A desired number of leveling blocks 20 are positioned side-by-side, stacked and interlocked as necessary to form a platform of a desired height for receiving one or more wheels A of the vehicle at a suitable height to level the vehicle in a known manner.

Figure 2:
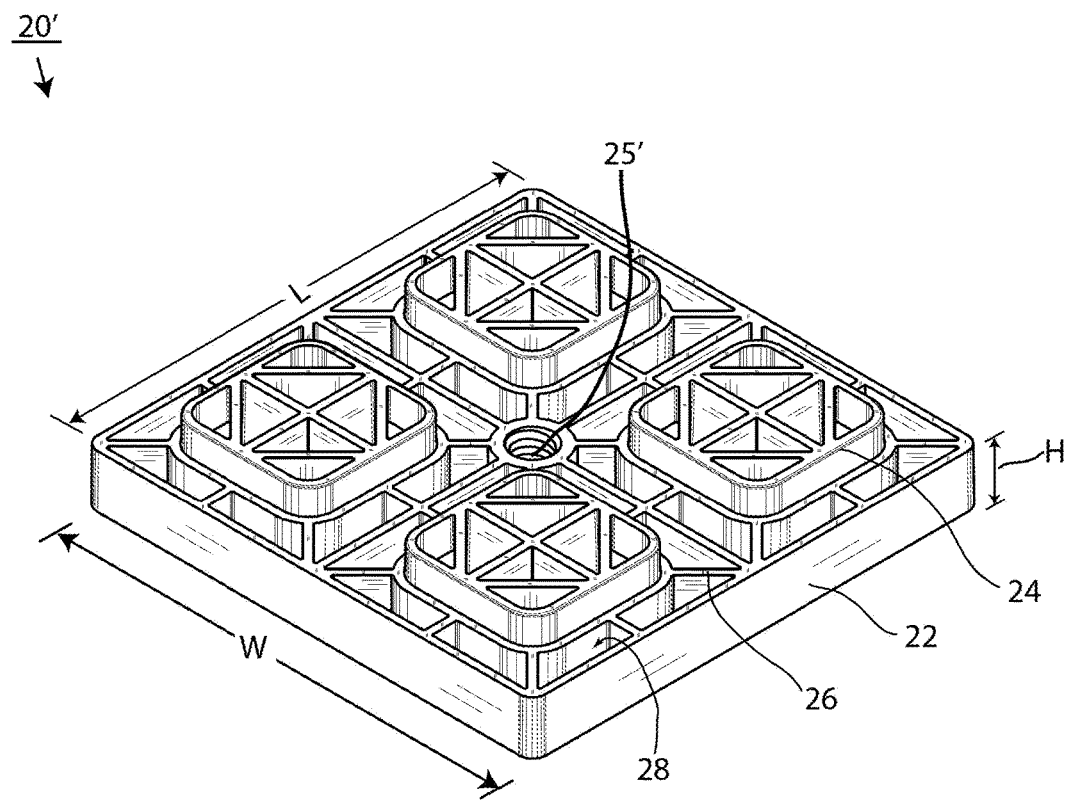
FIG. 2 is a perspective view showing a typical "base" leveling block of FIG. 1.
Figure 3:
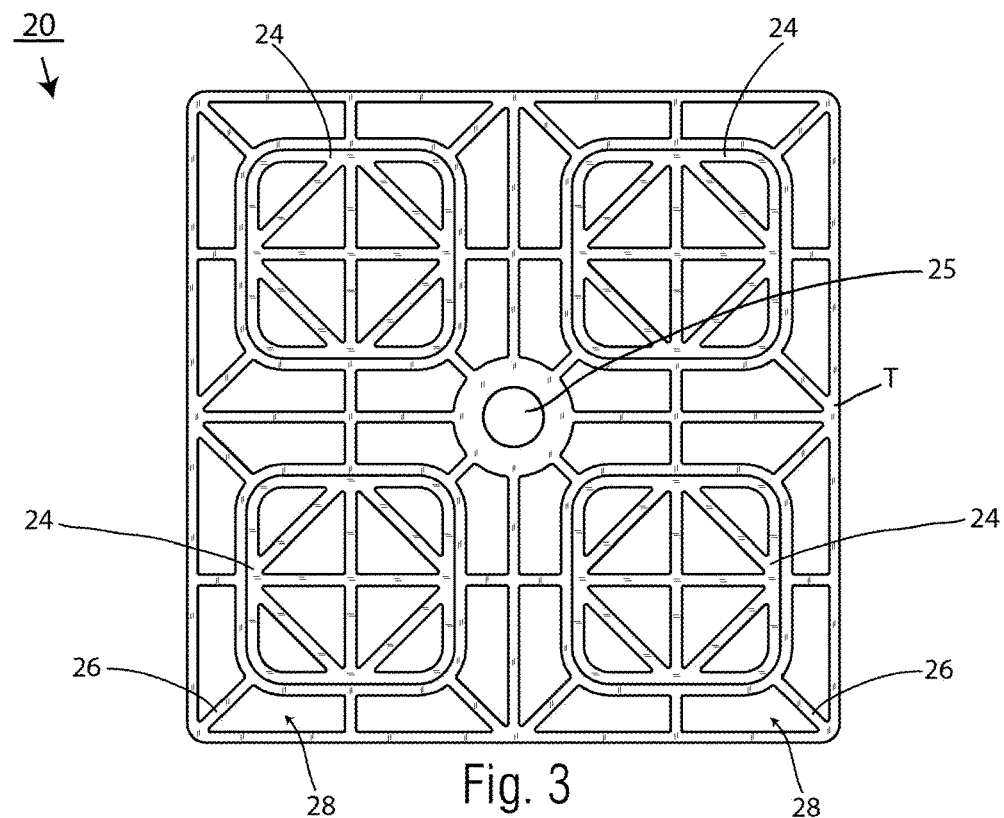
FIG. 3 is a top plan view of a typical leveling block.
Figure 7:
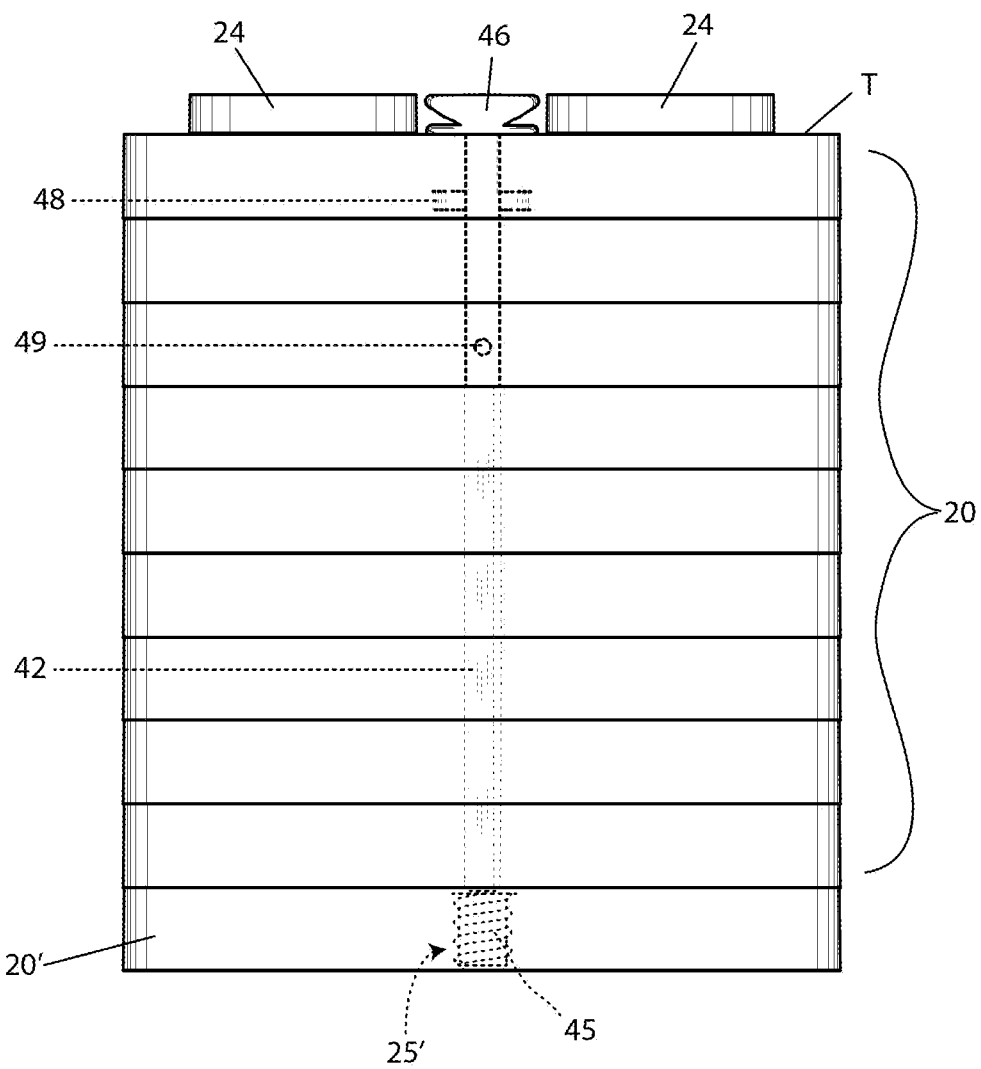
FIG. 7 is an elevational side view showing the leveling system of FIG. 5 in an assembled configuration.

FIG. 2 shows a "base" leveling block 20' in greater detail, which is the same in all respects to the other leveling blocks 20 (shown in FIGS. 3 and 4) but for the inclusion of an internal engagement member such as internal thread 25' which will be described further below. Each leveling block 20, 20' is made of a relatively lightweight, yet durable and sturdy material having a high strength to weight ratio, such as molded plastic, thermoplastic or composite. By way of example only and not limitation, the leveling blocks 20, 20' may be made of hard plastic material or lightweight metal material. Regardless, each leveling block 20, 20' comprises a body 22 defining a length L, a width W and a height H with the length L and the width W each being greater than the height H. As shown herein, length L and width W are substantially equal so that the leveling blocks 20, 20' defines a generally square footprint. However, leveling blocks 20, 20' may define any desired footprint, for example rectangular, suitable stacking and/or interlocking in the manner previously described with respect to FIG. 1. Leveling blocks 20, 20' may be generally box-shaped and planar, but preferably, at least a top surface T of the leveling block is non-planar and discontinuous. In one embodiment, leveling blocks 20, 20' comprises at least one protrusion 24 that projects outwardly from the top surface T (FIGS. 3 and 7). As shown herein, each leveling block 20, 20' has a plurality of protrusions 24 that project a predetermined distance outwardly from the top surface T. In the embodiment shown herein in FIGS. 2-4, leveling blocks 20, 20' have a total of four (4) protrusions 24 arranged symmetrically about perpendicular longitudinal and lateral central axes of the leveling block. An opening 25 is formed through the leveling block 20 at the intersection of the perpendicular longitudinal and lateral central axes for a purpose to be described hereafter.

Figure 4:
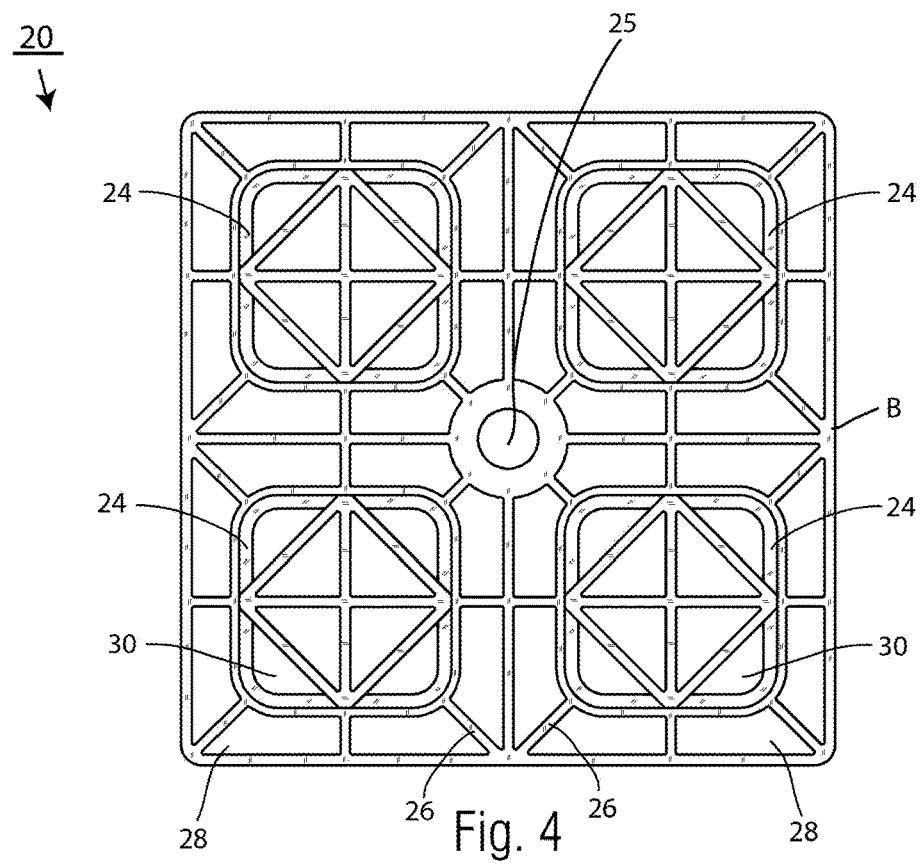
FIG. 4 is a bottom plan view of the leveling block of FIG. 3.

If desired, the leveling block (other than the opening 25) may be made solid through its thickness between the top surface T and a bottom surface B shown in FIG. 4. Alternatively, as shown in the embodiment of FIGS. 2-4, the leveling block 20 comprises a symmetric pattern of through ribs 26 interspaced with through voids 28. The pattern of strengthening ribs 26 and voids 28 reduce the overall weight of the leveling block, while maintaining sufficient strength and rigidity for supporting a vehicle. It should be noted, however, that the particular pattern of ribs 26 and voids 28 shown herein is for purposes of explanation only and that any suitable pattern of ribs, stiffeners or the like and voids, openings, recesses and the like may be utilized without departing from the intended broad scope of the present invention.

Regardless, the bottom surface B of the leveling blocks 20, 20' is provided with a plurality of recesses 30 corresponding to the plurality of protrusions 24 provided on the top surface T. Each recess 30 is configured (i.e., sized and shaped) to receive a protrusion 24 of another leveling block 20 therein. If desired, the recess 30 of one leveling block 20 and the corresponding protrusion 24 of another leveling block 20 may define a slight interference fit therebetween. In preferred embodiment, however, the recess 30 and the protrusion 24 define a somewhat loose fit, such that the leveling blocks 20 readily align together in a stacked configuration, especially when subjected to a compression loading, yet without sliding relative to one another. In this manner, adjacent leveling blocks 20 are interlocked together in a stacked configuration. Likewise, a pair of leveling blocks 20, 20' positioned in side-by-side relationship may be interlocked together by a third leveling block having its bottom surface B positioned onto a portion (i.e. one-half) of the top surface T of each of the pair of adjacent leveling blocks. Providing protrusions, ribs, projections, extensions or the like and corresponding recesses, voids, openings, slots, grooves or the like on a leveling block to permit stacking and/or interlocking without relative sliding or slipping between adjacent leveling blocks is well known in the art and forms a part of the present invention only in combination with the novel and non-obvious features shown and described herein.

Figure 5:
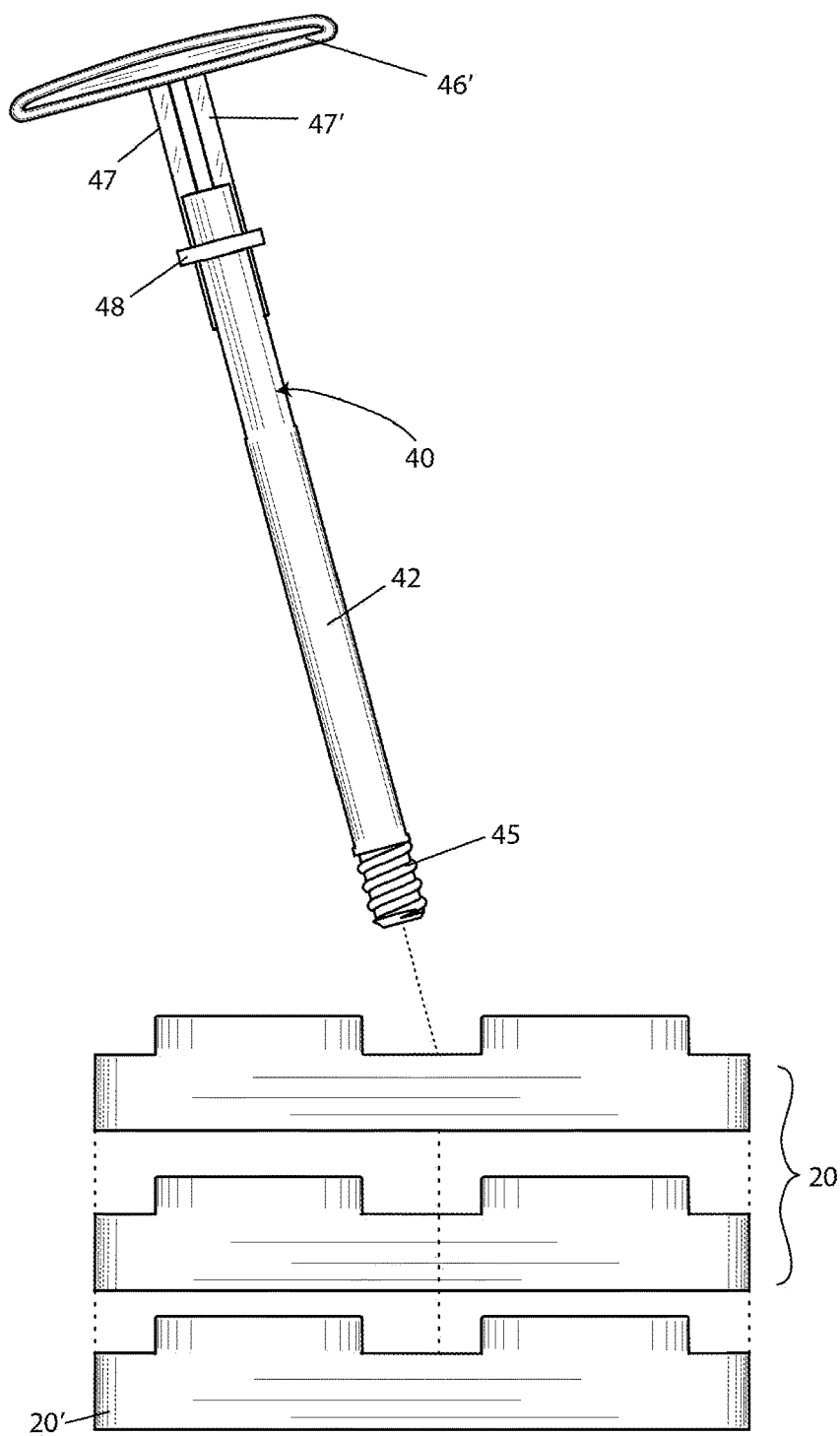
FIG. 5 is an exploded perspective view of a leveling system according to the present invention including a plurality of leveling blocks and a handle for convenient storage and transport shown in an unassembled configuration.
Figure 6:
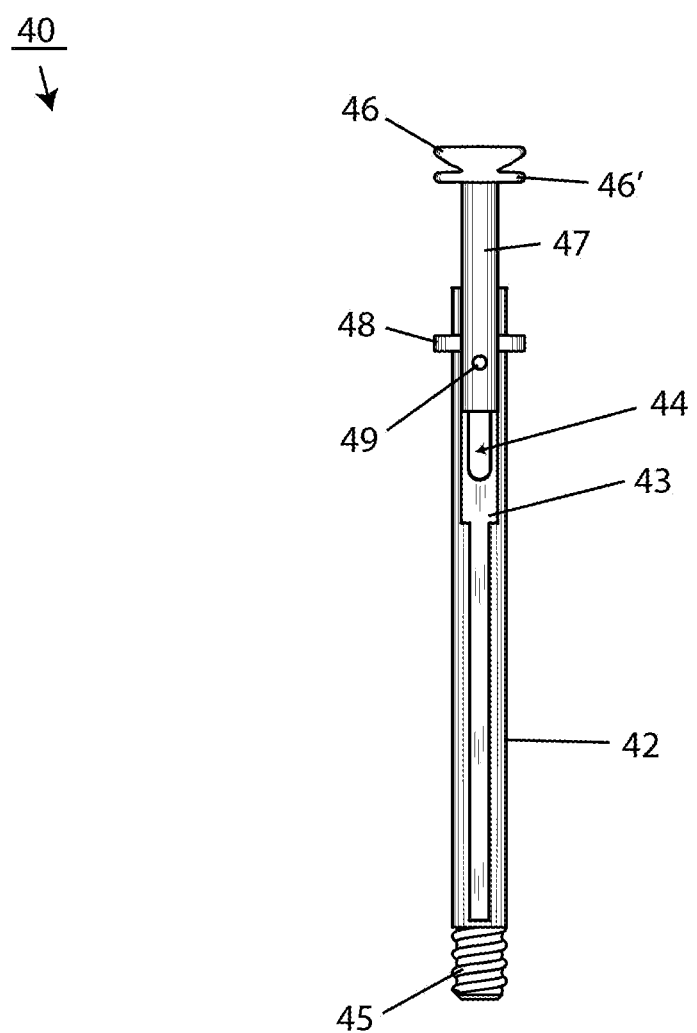
FIG. 6 is a sectional view showing the handle of FIG. 5 in greater detail.

FIGS. 5-7 show a leveling system, indicated generally herein by reference character 10, according to the present invention including a plurality of the leveling blocks 20 previously described and a handle, indicated generally by reference character 40. The leveling system 10, and more particularly handle 40, is operable for providing convenient storage and transport of the leveling blocks 20 as will be described hereafter. FIG. 5 shows the leveling system 10 consisting of the leveling blocks 20 and the handle 40 in an unassembled configuration. FIG. 6 shows the handle 40 in greater detail. FIG. 7 shows the plurality of leveling blocks 20 and the handle 40 in an assembled configuration.

A leveling system 10 according to the present invention comprises a plurality of the leveling blocks 20, 20' and a handle 40. By way of example only and not limitation, preferred leveling system 10 may comprise a total of ten (10) leveling blocks 20, 20' that are stackable together in the manner previously described. If desired, the leveling blocks 20 may also be interlocking one to another in the manner previously described. Furthermore, an optional additional cap or cover (not shown) having a relatively planar top surface may be positioned over the plurality of leveling blocks 20 so that one or more of the leveling blocks and the cap or cover may be utilized together to provide a relatively flat surface for use as a vehicle jack stand, stabilizing pad or the like. For purposes of convenient storage and transport, the leveling blocks 20 are stacked one on top of the other and the handle 40 is guided through the openings 25 formed through each of the leveling blocks 20. In one embodiment, at least the opening 25 of the bottommost "base" leveling block 20' is formed with an internal thread 25' configured for engaging with an external engagement member such as external thread 45 formed on the handle 40, as will be described hereafter. As a result, the plurality of leveling blocks 20, 20' is secured together by the handle 40 for convenient storage and transport in the assembled configuration illustrated in FIG. 7. Although preferred leveling system 10 is described with external thread 45 configured to engage internal thread 25', one of ordinary skill in the art would understand that the intent of inventor in the instant disclosure is to describe a system 10 with a handle 40 capable of mechanically engaging leveling blocks 20, 20', and other mechanisms such as hooks and catches, male and female snaps, biasing members and recesses, hook-and-loop material, and other engagement members as are known in the art also fall within the scope of this invention. It should also be noted that the assembled configuration is also useful for displaying the leveling system 10, for example in a retail store, such that a potential purchaser can immediately view and readily ascertain the functional design, geometry and aesthetics of the leveling blocks 20.

In one embodiment best shown in FIG. 6, handle 40 comprises a generally cylindrical body 42 defining an external thread 45 at a longitudinally distal end. The handle 40 further comprises an extensible and retractable portion 46 positioned adjacent a body 42 proximal end. The extensible and retractable portion 46 is provided with a pair of elongated rods 47, 47' and cylindrical body 42 defines a central, longitudinal recess 43 (FIG. 6) configured (i.e., sized and shaped) to receive each of rods 47 therein in a sliding relationship. If desired, body 42 of the handle 40 may be provided with an optional stop portion 48 positioned proximate the longitudinal limit of elliptical aperture 44 so as to engage with the top surface T of the topmost leveling block 20 (see FIG. 5) when the handle 40 is inserted into the plurality of leveling blocks 20, 20' and external thread 45 is rotatably threaded with the internal thread 25' provided on the bottommost leveling block 20'. Stop portion 48 may be, for example, an annular cylindrical or semi-cylindrical protrusion that projects radially outwardly from the body 42 of the handle 40. In addition, rods 47, 47' of the portion 46 and the recesses 43 of the body 42 of the handle 40 may define a mechanical shoulder or stop for limiting the travel of the extensible and retractable portion 46 in a downwards (i.e. towards thread 45) direction. Similarly, a stop portion 46' of the extensible and retractable portion 46 may be configured to frictionally engage with a top portion of body 42 on the handle 40 to likewise limit downwards travel of portion 46. An internal mechanical stop 49 provided on the extensible and retractable portion 46 of the handle 40 is operable for limiting travel of portion 46 in an upwards (i.e. away from thread 45) or downwards direction. In the preferred embodiment of handle 40, mechanical stop 49 is a pin oriented transversely through elliptical aperture 44.

Figure 8:
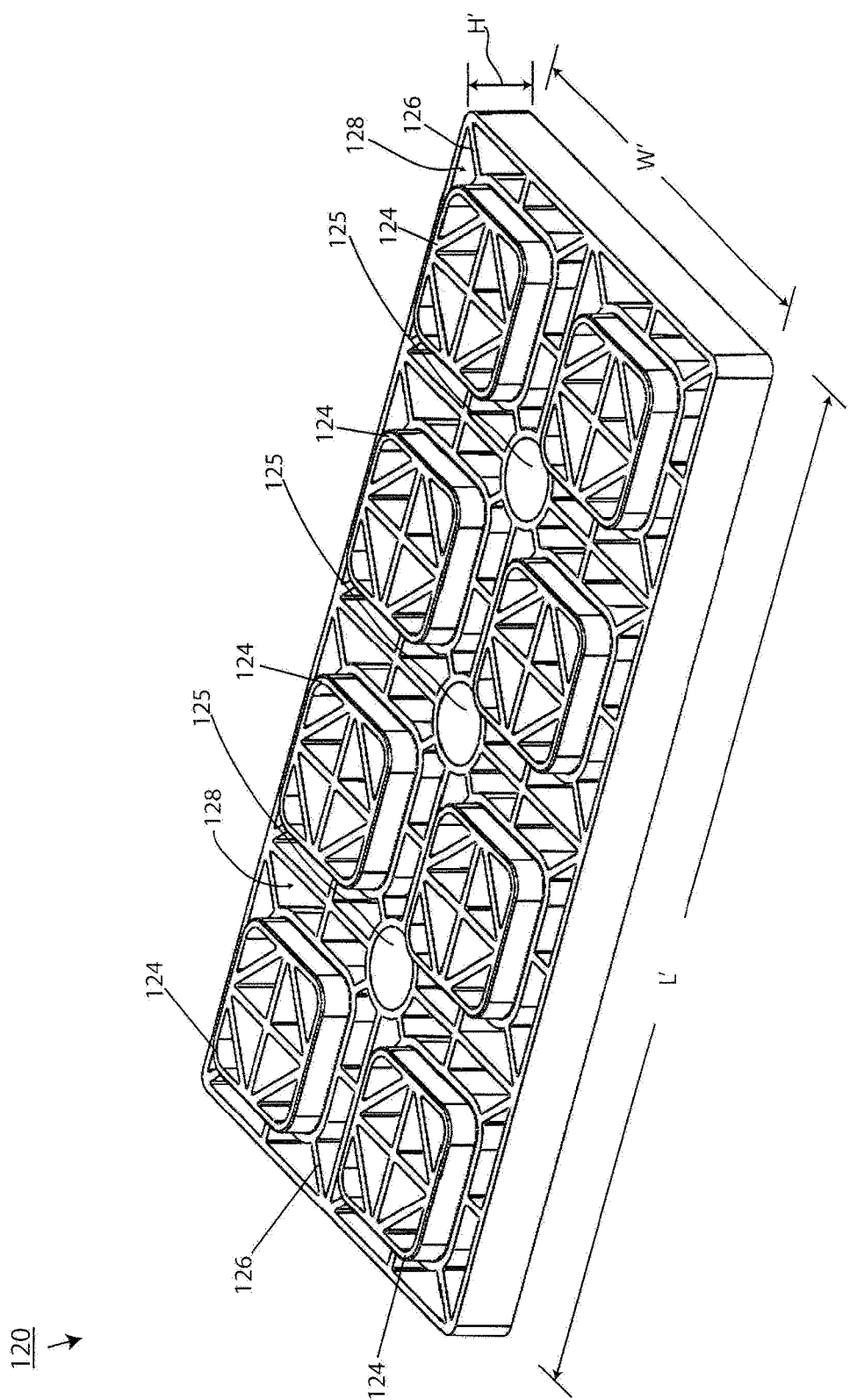
FIG. 8 is a perspective view of an alternate embodiment of a leveling block.

FIG. 8 is a perspective view of alternate leveling block 120, potentially to be used in combination with leveling blocks 20 as previously described. Leveling block 120 comprises a body 122 defining a length L', a width W' and a height H' with the length L' and the width W' each being greater than the height H. Contrary to leveling block 20, length L' is approximately double the value of width W', resulting in a generally rectangular footprint. Leveling block 120 is structurally similar to leveling block 20 is most respects, including having a plurality of protrusions 124 that project a predetermined distance outwardly from the top surface T. In the embodiment shown in FIG. 8 leveling block 120 has a total of eight (8) protrusions 124 arranged symmetrically about perpendicular longitudinal and lateral central axes of the leveling block. Leveling block 120 also comprises a symmetric pattern of through ribs 126 interspaced with through voids 128. The pattern of strengthening ribs 126 and voids 128 reduce the overall weight of the leveling block, while maintaining sufficient strength and rigidity for supporting a vehicle. Although not shown, it should be understood that protrusions 124 are intended to operatively engage recesses formed in the bottom of blocks 120, such recesses being similar to recesses 24 described herein. Further, as clearly shown in FIG. 8, leveling block 120 defines a series of apertures 125 generally positioned along the longitudinal midline of leveling block 120. Alternative embodiments may include one, two, or more threaded openings for rotatable engagement with threaded handle 40 as previously described. It is intended that this elongated embodiment of leveling block 120 may serve to expand the utility of leveling blocks 20, as well as provide a scaffold for the transportation and storage of greater number of leveling blocks 20, 20', and 120, as well as additional handles 40.

The foregoing detailed description of embodiments of the present invention provides an improved leveling system for leveling a relatively large vehicle, such as a recreational vehicle, camper, trailer and the like. A leveling system according to the present invention includes a plurality of leveling blocks operable for leveling a vehicle and a handle operable for mechanically securing the leveling blocks together for convenient storage and transport. However, it should be noted and will be readily understood and apparent to those skilled in the art that the drawings, figures, illustrations and examples provided herein are for explanatory purposes and are not intended to limit the scope of the following appended claims.

We claim:

1. A method for storing and transporting a plurality of leveling blocks, comprising:
   providing a plurality of leveling blocks for leveling a vehicle, each leveling block comprising a body having an opening formed therethrough, at least one opening of the plurality of leveling blocks being provided with an internal engagement member;
   providing a handle comprising an extendable and retractable portion adjacent a first end thereof and an external engagement member at a longitudinal opposite second end thereof, the extendable and retractable portion movable between a first, extended position relative to the plurality of leveling blocks and a second, retracted position relative to the plurality of leveling blocks, the handle also comprising a generally cylindrical body with a recess formed therein, the extendable and retractable portion defined by a pair of rods sized and shaped for receipt within the recess and connected by a traverse pin, wherein the cylindrical body defines an aperture, and wherein the traverse pin passes through the aperture;
   guiding the handle through the openings of the plurality of leveling blocks; and
   engaging the external engagement member of the handle with the internal engagement member provided on the at least one opening of the plurality of leveling blocks to secure the leveling blocks together.

2. The method according to claim 1, wherein each leveling block comprises at least one protrusion that extends upwardly from a top surface of the leveling block and at least one recess formed in a bottom surface of the leveling block, and wherein the method further comprises receiving the protrusion of one of the plurality of leveling blocks within the recess of another of the plurality of leveling blocks so that the plurality of leveling blocks are in a stacked and interlocking arrangement.

3. The method according to claim 1, wherein the handle is operable for securing the plurality of leveling blocks together for storage, transport, or display without a container.

4. The method of claim 2, further comprising the step of collapsing the extendable and retractable portion of the handle, wherein a top surface of the handle is co-planar with a top portion of the at least one protrusion.

5. The method according to claim 1, wherein the cylindrical body further comprises a stop portion configured to contact a top block of the plurality of leveling blocks when the handle is inserted into the plurality of leveling blocks.

6. The method according to claim 1, wherein the extendable and retractable portion of the handle further comprises a stop portion to contact a portion of the cylindrical body to limit the travel of the extendable and retractable portion of the handle.

7. The method of claim 1, further comprising the step of extending or retracting the extendable and retractable portion of the handle without displacing the engagement between the internal engagement member and the external engagement member.

8. A method for storing and transporting a plurality of leveling blocks, comprising:
   providing a plurality of leveling blocks for leveling a vehicle, each leveling block comprising a body having an opening formed therethrough, at least one opening of the plurality of leveling blocks defining an internal thread;
   providing a handle defining a pair of longitudinally opposing ends, an external thread defined at one of the opposing longitudinal ends and an extendable and retractable portion adjacent the other of the opposing longitudinal ends, the extendable and retractable portion movable between a first, extended position relative to the plurality of leveling blocks and a second, retracted position relative to the plurality of leveling blocks, the handle also comprising a generally cylindrical body with a recess formed therein, the extendable and retractable portion defined by a pair of rods sized and shaped for receipt within the recess and connected by a traverse pin, wherein the cylindrical body defines an aperture, and wherein the traverse pin passes through the aperture;
   guiding the handle through the openings of the plurality of leveling blocks; and
   engaging the external thread of the handle with the internal thread of the at least one opening of the plurality of leveling blocks to secure the leveling blocks together.

9. The method according to claim 8, wherein each leveling block comprises at least one protrusion that extends upwardly from a top surface of the leveling block and at least one recess formed in a bottom surface of the leveling block, and wherein the method further comprises receiving the protrusion of one of the plurality of leveling blocks within the recess of another of the plurality of leveling blocks so that the plurality of leveling blocks are in a stacked and interlocking arrangement.

10. The method according to claim 8, wherein the handle is operable for securing the plurality of leveling blocks together for storage, transport, or display without a container.

11. The method of claim 9, further comprising the step of collapsing the extendable and retractable portion of the handle, wherein a top surface of the handle is co-planar with a top portion of the at least one protrusion.

12. The method according to claim 8, wherein the cylindrical body further comprises a stop portion configured to contact a top block of the plurality of leveling blocks when the handle is inserted into the plurality of leveling blocks.

13. The method according to claim 8, wherein the extendable and retractable portion of the handle further comprises a stop portion to contact a portion of the cylindrical body to limit the travel of the extendable and retractable portion of the handle.

14. The method of claim 8, further comprising the step of extending or retracting the extendable and retractable portion of the handle without displacing the engagement between the internal thread and the external thread.

\* \* \* \* \*